United States Patent
Naiki et al.

[11] Patent Number: 6,101,018
[45] Date of Patent: Aug. 8, 2000

[54] LIGHT BEAM SCANNING OPTICAL APPARATUS

[75] Inventors: Toshio Naiki; Yoshihiro Inagaki; Akiyoshi Hamada, all of Toyokawa, Japan

[73] Assignee: Minolta Co., Ltd., Osaka, Japan

[21] Appl. No.: 09/066,515

[22] Filed: Apr. 24, 1998

[30] Foreign Application Priority Data

Apr. 25, 1997 [JP] Japan ..................................... 9-109555

[51] Int. Cl.$^7$ .................................................. G02B 26/08
[52] U.S. Cl. ......................... 359/204; 359/215; 359/216; 347/233; 347/244
[58] Field of Search ........................... 359/204, 216–219; 347/232, 233, 238, 241–244, 254

[56] References Cited

U.S. PATENT DOCUMENTS

| 5,241,329 | 8/1993 | Guerin . | |
| 5,831,758 | 11/1998 | Sakai et al. | 359/204 |
| 5,850,306 | 12/1998 | Fukutome et al. | 359/204 |

FOREIGN PATENT DOCUMENTS 59-117372  7/1984  Japan .

*Primary Examiner*—James Phan
*Attorney, Agent, or Firm*—Morrison & Foerster LLP

[57] ABSTRACT

A light beam scanning optical apparatus in which is capable of switching over the image density. The light beam scanning optical apparatus comprises a light source unit having at least three light emitting points, a control circuit block which selects and lights the light emitting points for switching over the image density at least either between different pages or within one page, an optical deflector for deflecting light beams emitted from the light emitting points, a scanning surface, a first optical system placed between the laser diode array and the optical deflector, and a second optical system placed between the optical deflector and the scanning surface. For switching over the image density, light emitting points corresponding to a specified image density are selected and lighted by the control circuit block. Thus, the switchover of image density in the direction of sub scanning is implemented not by mechanical operation of relatively slow response, but by electrical operation of quick response with selection of light emitting points.

10 Claims, 16 Drawing Sheets

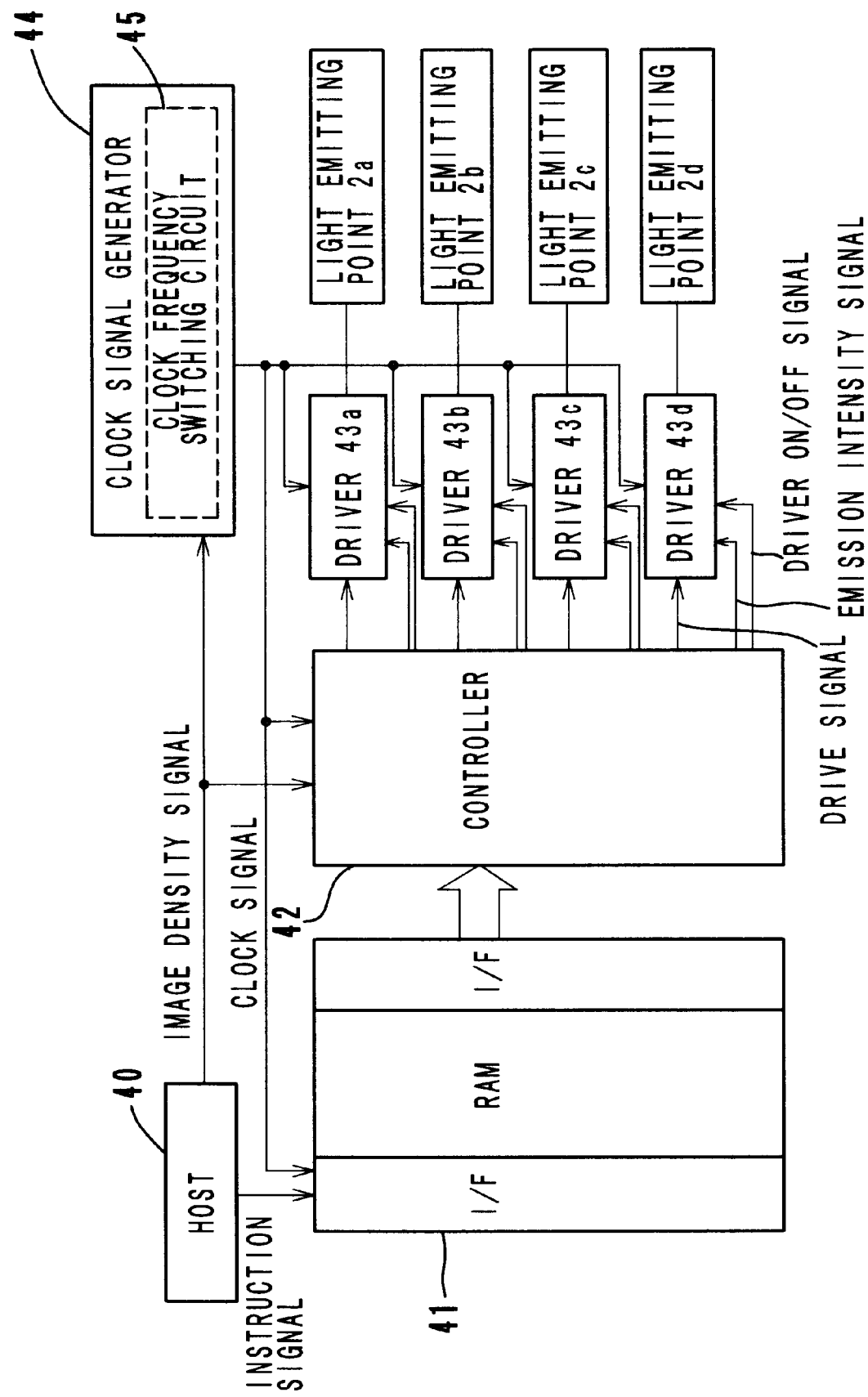

LIGHT BEAM SCANNING OPTICAL APPARATUS

This application is based on application No. 9-109555 filed in Japan, the contents of which are hereby incorporated by reference.

BACKGROUND OF THE INVENTION

1. Field of the Invention

The present invention relates to a light beam scanning optical apparatus, and particularly relates to a light beam scanning optical apparatus which is used as image writing means in a laser printer, a digital copying machine or the like.

2. Description of Prior Art

There has been known a light beam scanning optical apparatus capable of changing over the image density. In Japanese Patent Laid-Open Publication No. 59-117372, it has been disclosed an apparatus in which the image density is switched over by changing the clock frequency of drivers that drive the light emitting points and by changing the rotating speed (deflecting speed) of a polygon mirror serving as an optical deflector.

Also, in U.S. Pat. No. 5,241,329, it has been disclosed an apparatus that has a plurality of light emitting points and depicts one picture element with a specified number of light beams. In this apparatus, switchover of image density is implemented by changing the number of light beams which depict one picture element. Concretely, the apparatus has five emitting points; at an image of 240 DPI, for example, all five light beams emitted from five emitting points are used to depict one picture element. In the meantime, at an image of 300 DPI, one picture element is depicted with four light beams. In this case, at the first scan, light beams emitted from the leading four light emitting points out of five depict one complete picture element in the first scanning line; at the same time, a light beam emitted from the rest one light emitting point depicts one quarter of a picture element in the second scanning line. Then, the rest three quarters of the picture element in the second scanning line are depicted with light beams emitted from the leading three light emitting points out of five at the next scan and this picture element is completed; at the same time, the light beams emitted from the rest two light emitting points depict two quarters of a picture element in the third scanning line. Further, the rest two quarters of the picture element in the third scanning line are depicted with light beams emitted from the leading two light emitting points out of five at the following scan and this picture element is completed; at the same time, the light beams emitted from the rest three light emitting points depict three quarters of a picture element in the fourth scanning line. And so forth, picture elements are depicted.

However, in the apparatus disclosed in Japanese Patent Laid-Open Publication No. 59-117372, it would take time to change the rotating speed of the optical deflector, so that the image density could not be switched over instantaneously. On this account, for switching over the image density, there has been a restriction that a warm-up period must be ensured between different pages and moreover until the rotating speed of the optical deflector is stabilized. Therefore, for example, for a page in which character images and graphic images are intermixed within the one page, it would be impossible, even if desired, to depict the character image region at low density and depict the graphic image region at high density.

Meanwhile, with the arrangement disclosed in U.S. Pat. No. 5,241,329, it would be possible to switch over the image density within one page by changing the number of light beams which depict one picture element. However, this arrangement has problems. As being explained above, since one picture element is depicted with plural light beams, there would be a case that one picture element is formed with light beams from one scan and ones from the other scan. On this account, when there appears a shift on a light beam projecting position in the direction of main and/or sub scanning between one scan and the following scan, a picture element would not be correctly depicted. Besides, in some resolution, a dividing ratio of one picture element changes from line to line. In the above-mentioned image of 300 DPI, the picture elements of the second, the third, and the fourth scanning lines are divided in the dividing ratios 1:3, 2:2, and 3:1 respectively. Consequently, quality of image deteriorates. Further, since one picture element is depicted with plural light beams, and for that, corresponding relation between each light beam (each light emitting point) and a picture element is changing at each scan, a driving control at each light emitting point and a construction of driving circuit are on a large-scale and complicated.

SUMMARY OF THE INVENTION

It is an object of the invention to provide a light beam scanning optical apparatus in which the image density can be instantaneously switched over without switching over the rotating speed of the optical deflector, in which a controller and circuit for driving an each light emitting point are simple, and in which fine image quality is produced.

In order to achieve the above-mentioned object, a light beam scanning optical apparatus in accordance with the invention comprises a light source unit having at least three light emitting points, the three light emitting points being arranged so as to optically have intervals from one another in a direction perpendicular to the direction in which the light beams scan on the scanning surface, a deflecting device for deflecting light beams emitted from the light emitting points to scan the scanning surface, and a controller which selects and lights simultaneously at least two out of the light emitting points, the controller changes a combination of light emitting points to be lighted for switching image density at any arbitrary time point during a sequential operation of scanning the scanning surface from start to end, and an interval between incident light beams emitted from the light emitting points to the scanning surface differs at every combination of light emitting points, wherein one picture element is formed with a light beam emitted from one light emitting point on the scanning surface.

With this arrangement, for switching over the image density, light emitting points corresponding to a desired image density are selected and lighted by the controller. Thus, since the switchover of image density in the direction of sub scanning is implemented not by mechanical operation of relatively slow response, such as changing the deflecting speed of the deflecting device, but by electrical operation of quick response with selection of light emitting points, the switchover of image density in the direction of sub scanning can be promptly achieved.

A light beam scanning optical apparatus in accordance with the invention is provided light emitting points being one-dimensionally arranged, and a ratio of n image densities to be switched over is $a_1:a_2: \ldots :a_n (a_1<a_2< \ldots <a_n)$, the number of light emitting points is $$\sum_{i=1}^{n} a_i - 1 \text{ (hereinafter, expressed as } \sum a_i - 1\text{)}.$$

Besides, the least common multiple of $a_1, a_2, \ldots, a_n$ is m, an interval between two light emitting points positioned at both ends of the plurality of one-dimensionally arrayed light emitting points is $(m-a_1)$ times an interval between the closest light emitting points. Further, a distance to which the scanning surface moves in a direction of sub scanning during one deflective scan of the deflecting device is approximately m times an interval between the light beams emitted from the closest light emitting points on the scanning surface. With these arrangements, number and interval of one-dimensionally arrayed light emitting points are set to optimum ones.

Also, a ratio of n image densities to be switched over is $a_1:a_2: \ldots :a_n(a_1<a_2< \ldots <a_n)$, the number of light emitting points is $(\Sigma a_i-1)$, and the least common multiple of $a_1, a_2, \ldots, a_n$ is m, and the plurality of two-dimensionally arrayed light emitting points are projected on an axis parallel to the direction of sub scanning, then an interval between two projectional light emitting points positioned at both ends of a plurality of projectional light emitting points is $(m-a_1)$ times an interval between closest projectional light emitting points, and a distance to which the scanning surface moves in the direction of sub scanning during one deflective scan of the deflecting device is approximately m times an interval between light beams of the closest projectional light emitting points on the scanning surface.

With this arrangement, number and interval of two-dimensionally arrayed light emitting points are set to optimum ones. Besides, even if the interval of the light emitting points is set relatively wide with a view to suppressing thermal crosstalk between the light emitting points, the interval of the light emitting points in the direction of sub scanning can be narrowed apparently.

The light source unit further comprises a beam coupling device for superimposing light beams emitted from the light emitting points, respectively, so as to make the light beams travel in the same direction, and wherein a ratio of n image densities to be switched over is $a_1:a_2: \ldots a_n(a_1<a_2< \ldots <a_n)$, the number of light emitting points is $(\Sigma a_i-1)$, and the least common multiple of $a_1, a_2, \ldots, a_n$ is m, an interval between two light beam emitting positions located at both ends of the plurality of light beam emitting positions on the light emitting surface of the beam coupling device is $(m-a_1)$ times an interval between closest light beam emitting positions and a distance to which the scanning surface moves in the direction of sub scanning during one deflective scan of the deflecting device is approximately m times an interval between the light beams emitted from the closest light emitting positions on the scanning surface. With this arrangement, the light emitting points are provided to a plurality of devices, eliminating the need of providing all the light emitting points in one device. Thus, the effects of thermal crosstalk between the light emitting points can be further reduced.

A light beam scanning optical apparatus comprises clock frequency switching means for changing a clock frequency of drive signals for the light emitting points in response to the image density. The clock frequency of drive signals for the light emitting points can be switched over in response to the image density. Therefore, the image density in the direction of main scanning is also switched over by electrical operation of quick response, as in the switching of the image density in the direction of sub scanning.

Besides, when light emitting points corresponding to a specified image density are driven after being switched to an emission intensity given by a reciprocal ratio of the image density, the quantity of incident light on the scanning surface becomes constant even with different image densities.

BRIEF DESCRIPTION OF THE DRAWINGS

These and other objects and features of the present invention will become apparent from the following description with reference to the accompanying drawings, in which:

FIG. 5 is a block diagram of a control circuit for switching over the image densities;

DETAILED DESCRIPTION OF THE PREFERRED EMBODIMENTS

Hereinafter, embodiments of light beam scanning optical apparatus in accordance with the invention will be described referring to the accompanying drawings.

Figure 1:
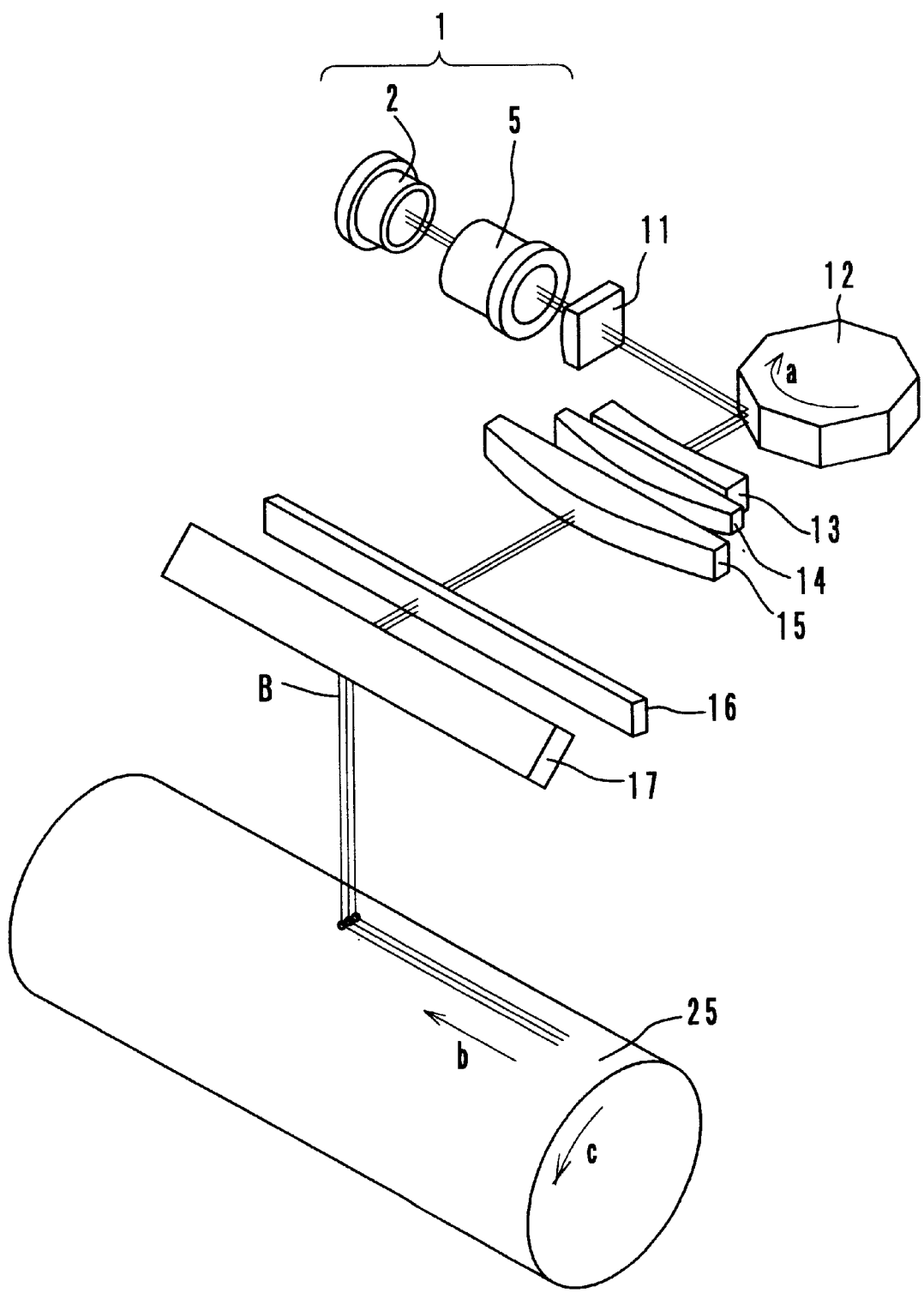
FIG. 1 is a schematic view of an embodiment of a light beam scanning optical apparatus in accordance with the invention.

In FIG. 1, a light beam scanning optical apparatus generally comprises a light source unit 1, a cylindrical lens 11, a polygon mirror 12, three fθ-lenses 13, 14 and 15, a cylindrical lens 16, a plane mirror 17 and a photosensitive drum 25.

The light source unit 1 comprises a laser diode array 2 and a collimator lens 5. The collimator lens 5 has a shape symmetrical with respect to its axis, which is positioned on the optical axis C of the scanning optical apparatus. The laser diode array 2 has a plurality of light emitting points as described later. A plurality of light beams B emitted from the laser diode array 2 are shaped into parallel (or convergent) bundles of rays by the collimator lens 5.

The light beams B emergent from the collimator lens 5 reach the polygon mirror 12 through the cylindrical lens 11. The cylindrical lens 11 converges the light beams B into the shapes of lines extending in the direction of main scanning, in the vicinity of a reflecting surface of the polygon mirror 12. The polygon mirror 12 is driven so as to rotate at a uniform angular speed in the direction of an arrow "a". The light beams B are deflected for scanning, at a uniform angular speed by the reflecting surfaces of the polygon mirror 12 in response to the rotation of the polygon mirror 12. The beams B pass through the fθ-lenses 13, 14, 15 and the cylindrical lens 16, being reflected downward by the plane mirror 17. After that, the light beams B are focused on the photosensitive drum 25, which is scanned with the beams in the direction of an arrow "b".

The fθ-lenses 13, 14 and 15 have a function of correcting distortion, i.e., a function of correcting the main scanning speed of the light beams B deflected at the uniform angular speed by the polygon mirror 12 to a constant speed in the photosensitive drum 25. The cylindrical lens 16 has a power only in the direction of sub scanning in the same way as the cylindrical lens 11. Both the two lenses 11, 16 cooperate with each other to correct errors in perpendicularity of the reflecting surfaces of the polygon mirror 12.

The photosensitive drum 25 is driven so as to rotate at a uniform speed in the direction of an arrow "c", so that an image (an electrostatic latent image) is written on the photosensitive drum 25 by main scanning performed by the polygon mirror 12 and the fθ-lenses 13, 14 and 15 in the direction of the arrow "b", and by sub scanning performed by the photosensitive drum 25 in the direction of the arrow "c".

Figure 2:
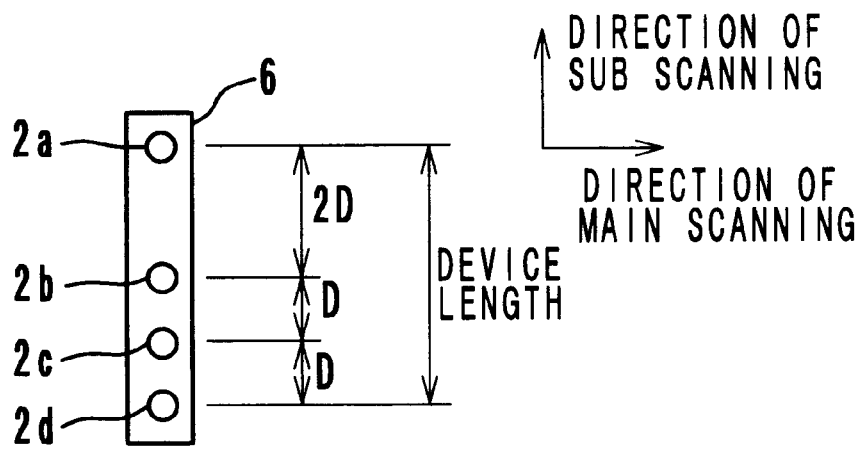
FIG. 2 is a plan view of a first example of the laser diode array in accordance with the invention.

Next, a first example of the laser diode array 2 is described in detail. In the following embodiments, the same components and the same parts will be designated by the same numerals. As shown in FIG. 2, the laser diode array 2 of the first example contains a substrate 6 having four light emitting points $2a$, $2b$, $2c$ and $2d$ provided on its surface. The light emitting points $2a$ to $2d$ are one-dimensionally arrayed at unequal distances in a direction parallel to the direction of sub scanning. If the closest light emitting point interval between the light emitting points $2a$ to $2d$ is D, then the interval between the light emitting points $2a$ and $2b$ is set to 2D and both the interval between the light emitting points $2b$ and $2c$ and the interval between the light emitting points $2c$ and $2d$ are set to D. The laser diode array 2 of the first example is enabled to switch over between two image densities, 400 dpi and 600 dpi.

Generally, the required least number of one-dimensionally arrayed light emitting points can be determined as $\Sigma a_i - 1$, when the ratio of n image densities to be switched over is $a_1:a_2: \ldots :a_n$ ($a_1 < a_2 < \ldots < a_n$, and $a_1$ through $a_n$ are reduced least values). Then, when the L.C.M. (least common multiple) of $a_1, a_2, \ldots, a_n$ is m, then the optimum interval (hereinafter, referred to as optimum device length) between two light emitting points located at both ends of the plurality of one-dimensionally arrayed light emitting points is $(m-a_1)$ times the closest light emitting point interval D.

Accordingly, in the case of the laser diode array 2 of the first example, because the ratio of image densities is $a_1:a_2 = 2:3$, the required least number of light emitting points is $\Sigma a_i - 1 = a_1 + a_2 - 1 = 2 + 3 - 1 = 4$ (points). Also, because the L.C.M. m of $a_1=2$ and $a_2=3$ is 6, the optimum device length is $(m-a_1) \times D = (6-2) \times D = 4D$.

Figure 3:
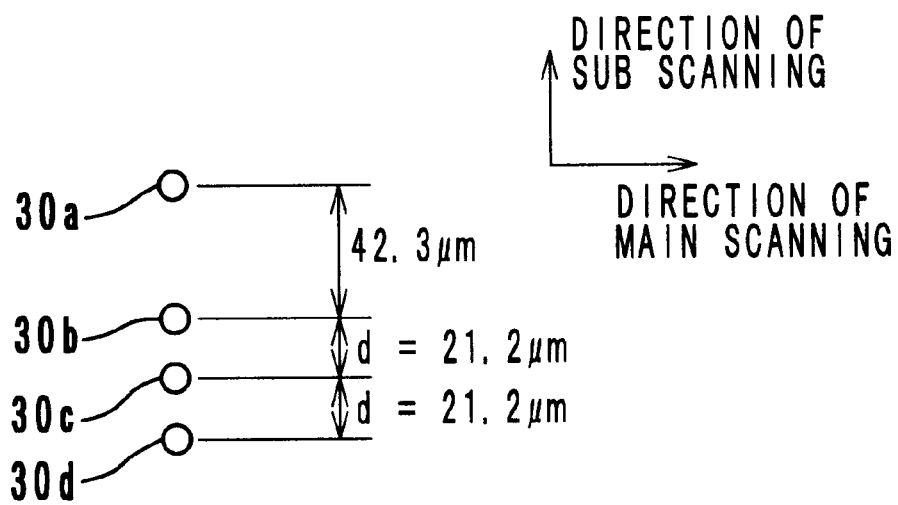
FIG. 3 is an illustration which shows beam spots on a photosensitive drum of laser beams emitted from the laser diode array shown in FIG. 2.
Figure 4A:
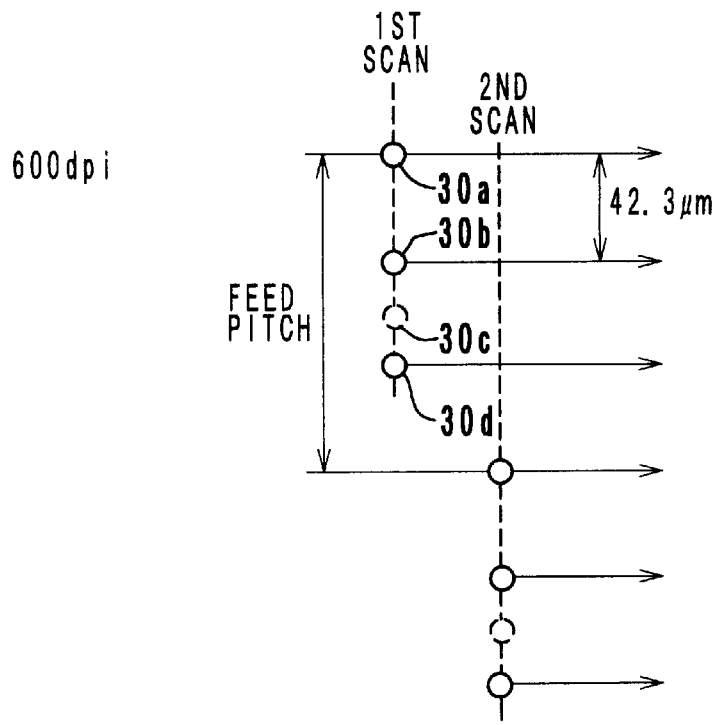
FIGS. 4A and 4B are illustrations which show beam spots on the photosensitive drum in the case that images of 400 dpi and 600 dpi are formed, respectively.
Figure 4B:
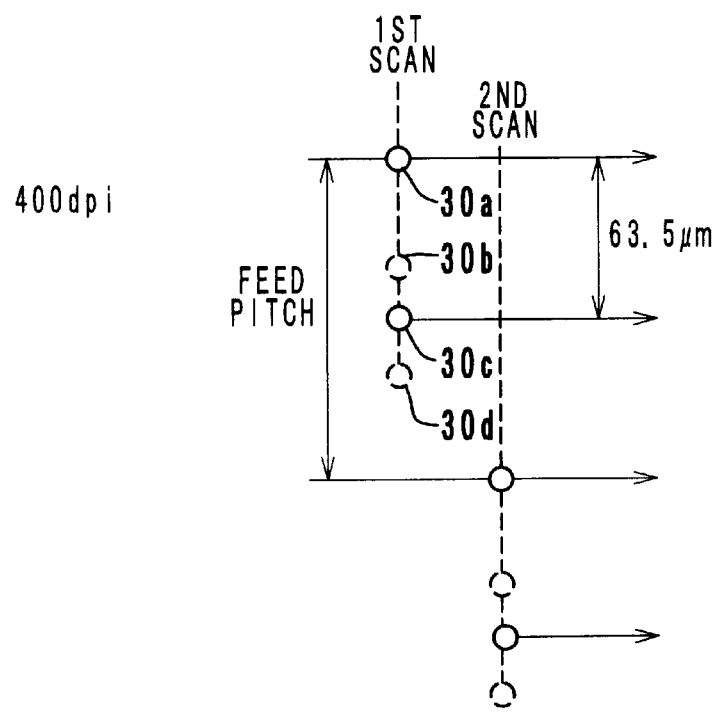

Referring to FIGS. 3, 4A and 4B, a description will be provided below on the case that the light beam scanning optical apparatus comprising the laser diode array 2 having the above construction, its image is written on the photosensitive drum 25.

As shown in FIG. 3, the light beams B emitted from the light emitting points $2a$ to $2d$, respectively, form light beam spots $30a$ to $30d$ on the photosensitive drum 25. These light beam spots $30a$ to $30d$ are of unequal distances in the direction of sub scanning. The interval between the light beam spots $30a$ and $30b$ is approximately 42.3 μm. The interval between the light beam spots $30b$, $30c$ and $30d$ is approximately 21.2 μm. As shown in FIG. 4A, in forming an image of 600 dpi on the photosensitive drum 25, the light emitting points $2a$, $2b$ and $2d$ are lighted with the light emitting point $2c$ being unlighted. As a result, the light beams B emitted from the light emitting points $2a$, $2b$ and $2d$, respectively, form light beam spots $30a$, $30b$ and $30d$ at the interval of approximately 42.3 μm in the direction of sub scanning on the photosensitive drum 25. With these light beam spots $30a$, $30b$ and $30d$, scanning lines are scanned sequentially from the front extremity of the image.

Generally, an optimum distance (hereinafter, referred to as optimum feed pitch) to which the surface of the photosensitive drum 25 moves in the direction of sub scanning during one deflective scan of the polygon mirror 12 is set to m times the interval on the photosensitive drum 25 of the light beams emitted from the closest light emitting points (where m is the L.C.M. of the foregoing $a_1, a_2, \ldots, a_n$). Accordingly, in the case of the first example, the optimum feed pitch is determined to be $m \times 21.2 = 6 \times 21.2 \approx 127$ μm. This optimum feed pitch is maintained constant without depending on the image density.

Next, in forming an image of 400 dpi with the image density switched over from 600 dpi to 400 dpi, as shown in FIG. 4B, the light emitting points $2a$ and $2c$ are lighted with the light emitting points $2b$ and $2d$ being unlighted. As a result, the light beams B emitted from the light emitting points $2a$ and $2c$, respectively, form light beam spots $30a$ and $30c$ at the interval of 63.5 μm in the direction of sub scanning on the photosensitive drum 25. With these light beam spots $30a$ and $30c$, scanning lines are scanned sequentially from the front extremity of the image.

As shown in FIG. 5, a control circuit for switching over the image density generally comprises a RAM 41 for storing image data, a controller 42 for controlling the light emitting points $2a$ to $2d$ of the laser diode array 2, drivers $43a$ to $43d$ for driving the light emitting points $2a$ to $2d$ and a clock signal generator 44 for determining the clock frequency of drive signals for the light emitting points $2a$ to $2d$.

The light beam scanning optical apparatus of this embodiment is incorporated into, e.g., a digital copying machine with a mechanism capable of discriminating between character images and graphic images in reading the document makes it possible that, out of image data obtained by reading one sheet of document with character images and graphic images intermixed, character image data has a low-density code automatically added thereto and graphic image data has a high-density code automatically added thereto. Otherwise, it may also be arranged that with a personal computer connected to the digital copying machine, an image read by the digital copying machine is displayed on the computer's screen, where a low-density code is added to image data corresponding to a character image region and a high-density code is added to image data corresponding to a graphic image region by key operation from the personal computer.

A host computer 40 reads the low-density or high-density code added to the image data, generating an image density signal. For example, if the host computer 40 has read image data with a high-density code added, an image density signal is transmitted from the host computer 40 to the controller 42 and the clock signal generator 44. On the basis of the image density signal, the controller 42 transmits driver ON/OFF signals to the drivers 43a to 43d to turn on the drivers 43a, 43b, 43d and to turn off the driver 43c. As a result, the image density in the direction of sub scanning can be switched over promptly to 600 dpi by electrical operation of quick response. Accordingly, the image density can be switched over either between different pages or within one page. Besides, switchover of the image density in one scanning operation is also possible.

As described above, this light beam scanning optical apparatus allows the image density to be switched over at any time point in a sequence of scanning operations from start to end, while the polygon mirror 12 is maintained constant in rotating speed, i.e., scanning speed. In addition, the image density can be reworded as a distance between picture elements assigned to each of image data.

Further, on the basis of the image density signal, the controller 42 controls driving voltages for the drivers 43a, 43b and 43d by transmitting emission intensity signals to the drivers 43a, 43b and 43d, so that the light emitting points 2a, 2b and 2d are lighted with an emission intensity given by a reciprocal ratio of the image density to form an image of 600 dpi. In the case of the laser diode array 2 of the first example, because two image densities of 600 dpi and 400 dpi are used, the ratio of image densities is 3:2.

Accordingly, the ratio of the emission intensity of the light emitting point 2a, 2b and 2d in forming an image of 600 dpi to the emission intensity of the light emitting points 2a and 2c in forming an image of 400 dpi is ⅙:¼=2:3, so that the light emitting points 2a, 2b and 2d are adjusted in driving voltage so as to light with an emission intensity ⅔ that in forming an image of 400 dpi. As a result, even when the image density has become 600 dpi, the quantity of incident light on the photosensitive drum 25 is the same as that in the 400 dpi. The quantity of incident light on the photosensitive drum 25 can be maintained constant regardless of the image density, so that a stable image quality can be obtained.

The clock signal generator 44 contains a clock frequency switching circuit 45. On the basis of the image density signal, the clock frequency switching circuit 45 changes the clock frequency of drive signals for the light emitting points 2a to 2d into a frequency responsive to the image density. The clock signal the frequency of which has been changed by the clock frequency switching circuit 45 is transmitted to the RAM 41, the controller 42 and the drivers 43a to 43d. As a result, the image density in the direction of main scanning can be switched over promptly to 600 dpi by electrical operation of quick response. Also in the following examples of the laser diode array 2, the image density in the direction of main scanning is promptly switched over by the clock frequency switching circuit 45 similarly.

As explained above, in the light beam scanning optical apparatus in this example, it is controlled so as to change a combination of light emitting points to be lighted corresponding to a resolution, and one picture element is depicted with a light beam emitted from one light emitting point at any resolution. For that reason, once a resolution is decided, light emitting points (laser diode) corresponding to a specific picture element is chosen univocally; therefore, it does not need a large-scale and complicated controller or circuit.

Subsequently, an instruction signal is inputted from the host computer 40 through an interface (I/F) into the RAM 41, and then the image data stored in the RAM 41 is sequentially extracted and transmitted to the controller 42. The controller 42 outputs the respective image data after a specified time elapse. The image data signals sequentially outputted from the controller 42 are transmitted to the drivers 43a, 43b and 43d, which drive the light emitting points 2a, 2b and 2d, respectively.

Figure 6:
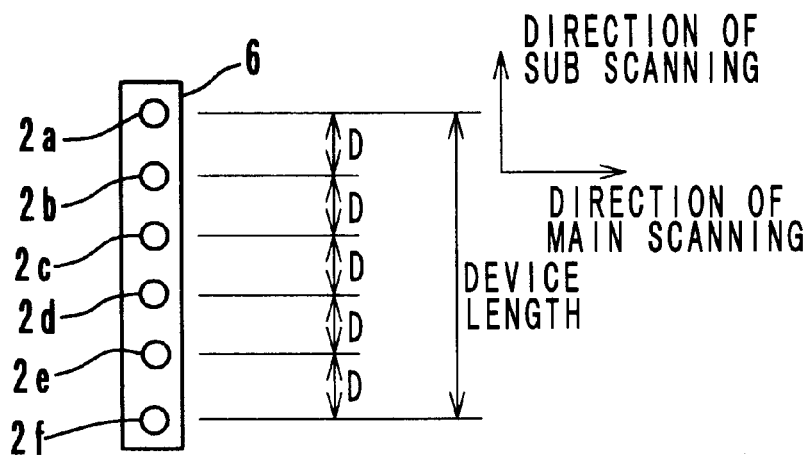
FIG. 6 is a plan view of a second example of the laser diode array in accordance with the invention.

A second example of the laser diode array 2 is described in detail with reference to FIGS. 6 and 7. As shown in FIG. 6, the laser diode array 2 of the second example contains a substrate 6 having six light emitting points 2a, 2b, 2c, 2d, 2e and 2f provided on its surface. The light emitting points 2a to 2f are arrayed one-dimensionally at equal interval in a direction parallel to the direction of sub scanning. The interval of the light emitting points 2a to 2f is set to D.

Figure 7A:
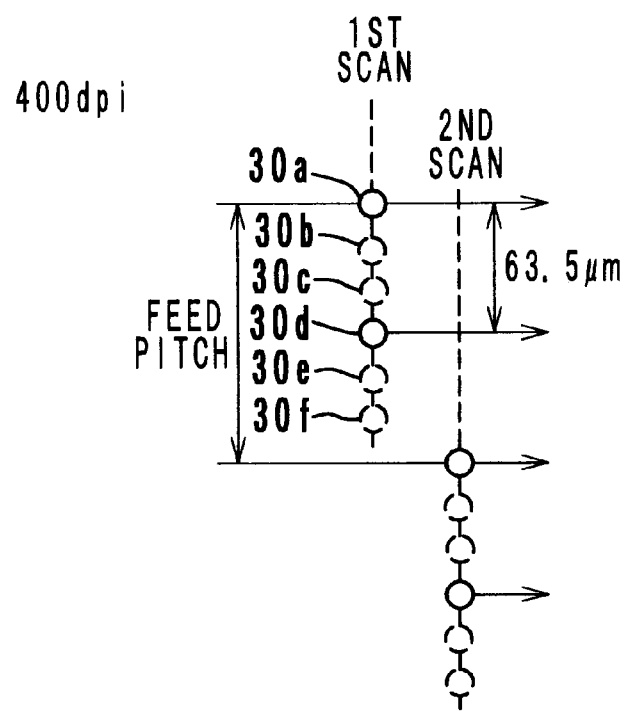
FIGS. 7A, 7B and 7C are illustrations which show beam spots on a photosensitive drum in the case that images of 400 dpi, 600 dpi and 1200 dpi are formed, respectively.
Figure 7B:
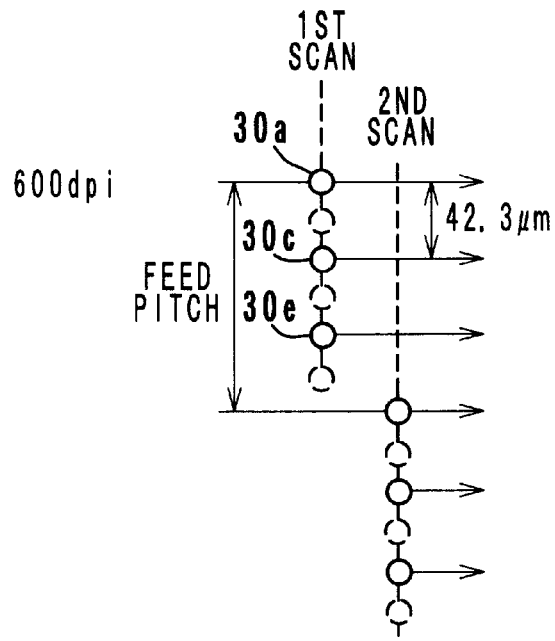
Figure 7C:
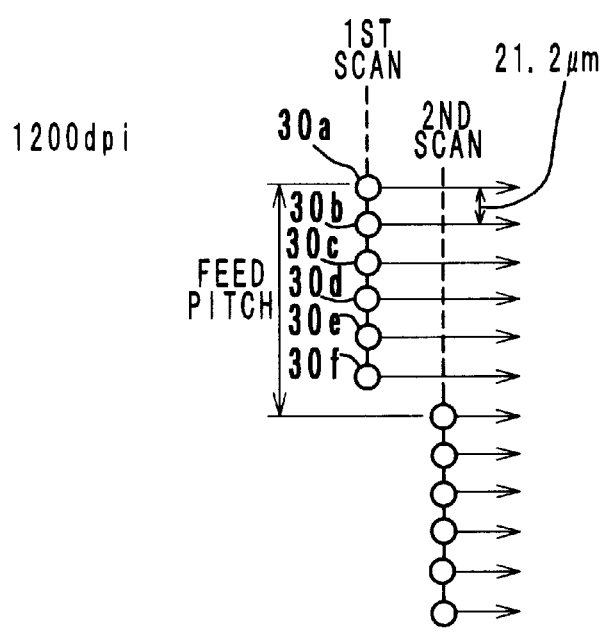

Referring to FIGS. 7A, 7B and 7C, a description will be provided below on the case that the light beam scanning optical apparatus comprising the laser diode array 2 of the second example having the above construction, its image is written on the photosensitive drum 25. In the case of the second example, three image densities, 400 dpi, 600 dpi and 1200 dpi, can be switched over.

As shown in FIGS. 7A, 7B and 7C, the light beams B emitted from the light emitting points 2a to 2f, respectively, form light beam spots 30a to 30f on the photosensitive drum 25. These light beam spots 30a to 30f are of equal interval in the direction of sub scanning, the interval being approximately 21.2 μm. As shown in FIG. 7A, in forming an image of a 400 dpi on the photosensitive drum 25, only the light emitting points 2a and 2d are lighted. As a result, the light beams B emitted from the light emitting points 2a and 2d, respectively, form light beam spots 30a and 30d at the interval of 63.5 μm in the direction of sub scanning on the photosensitive drum 25. With these light beam spots 30a and 30d, scanning lines are scanned sequentially from the front extremity of the image. For this process, the feed pitch P in the direction of sub scanning by rotation of the photosensitive drum 25 is set to 127 μm. This feed pitch is maintained constant without depending on the image density.

Next, in forming an image of 600 dpi with the image density switched over from 400 dpi to 600 dpi, as shown in FIG. 7B, the light emitting points 2a, 2c and 2e are lighted. As a result, the light beams B emitted from the light emitting points 2a, 2c and 2e, respectively, form light beam spots 30a, 30c and 30e at the interval of approximately 42.3 μm in the direction of sub scanning on the photosensitive drum 25. With these light beam spots 30a, 30c and 30e, scanning lines are scanned sequentially from the front extremity of the image.

Next, in forming an image of 1200 dpi with the image density switched over from 600 dpi to 1200 dpi, all the light emitting points 2a to 2f are lighted. As a result, the light beams B emitted from the light emitting points 2a to 2f, respectively, form light beam spots 30a to 30f at the interval of approximately 21.2 μm in the direction of sub scanning on the photosensitive drum 25. With these light beam spots 30a to 30f, scanning lines are scanned sequentially from the front extremity of the image. This laser diode array 2 of the second example produces functional effects similar to those of the first laser diode array. In addition, the image density can be reworded as a distance between picture elements assigned to each of image data.

Further, emission intensity of the light emitting points 2a to 2f is switched over by the controller 42 so that the quantity of incident light on the photosensitive drum 25 becomes constant even with different image densities. That is, the light emitting points 2a to 2f are driven while light emitting points 2a to 2f corresponding to a specified image density are switched to an emission intensity given by a reciprocal ratio of the image density. This is explained concretely by using numerical values. Because three image densities of 400 dpi, 600 dpi and 1200 dpi are used, the ratio of image densities is 2:3:6. Accordingly, the ratio of the emission intensity of the light emitting points 2a and 2d for forming an image of 400 dpi, to the emission intensity of the light emitting points 2a, 2c and 2e for forming an image of 600 dpi, to the emission intensity of the light emitting points 2a to 2f for forming an image of 1200 dpi is ½:⅓:⅙=3:2:1. Accordingly, the light emitting points 2a to 2f for forming an image of 1200 dpi are adjusted in driving voltage so as to light with an emission intensity ⅓ that in forming an image of 400 dpi.

Figure 8:
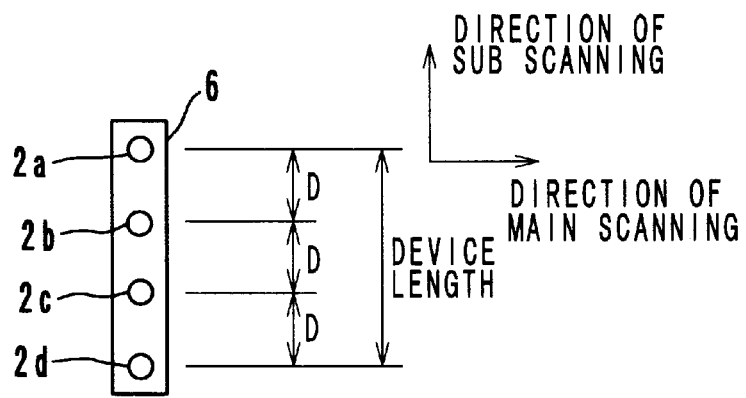
FIG. 8 is a plan view of a third example of the laser diode array in accordance with the invention.

A third example of the laser diode array 2 is described in detail with reference to FIGS. 8, 9A and 9B. As shown in FIG. 8, the laser diode array 2 of the third example contains a substrate 6 having four light emitting points 2a, 2b, 2c and 2d provided on its surface. The light emitting points 2a to 2d are arrayed one-dimensionally at equal interval in a direction parallel to the direction of sub scanning. The intervals of the light emitting points 2a to 2d are set to D.

Figure 9A:
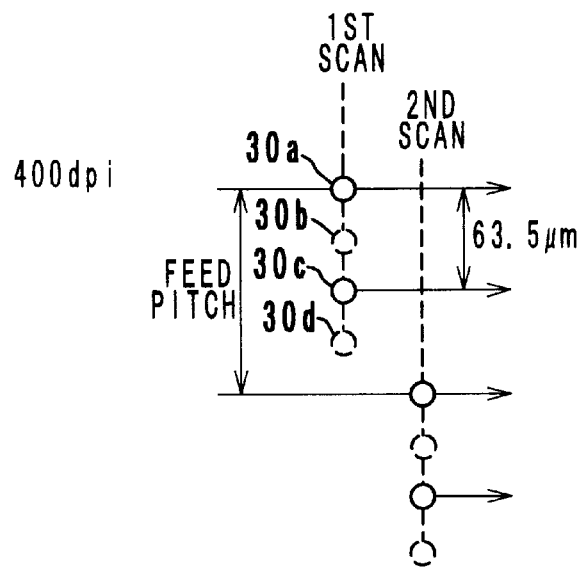
FIGS. 9A and 9B are illustrations which show beam spots on a photosensitive drum in the case that images of 400 dpi and 800 dpi are formed, respectively.
Figure 9B:
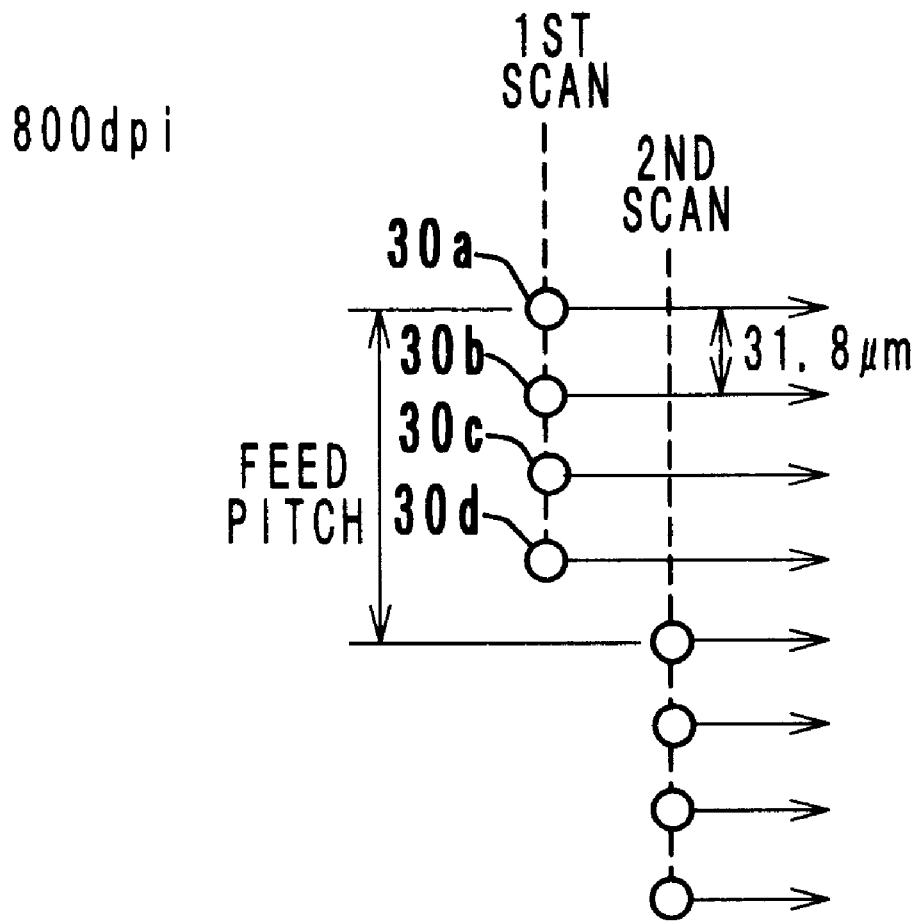

Referring to FIGS. 9A and 9B, a description will be provided below on the case that the light beam scanning optical apparatus comprising the laser diode array 2 of the third example having the above construction, its image is written on the photosensitive drum 25. In the case of the third example, two image densities, 400 dpi and 800 dpi, can be switched over.

As shown in FIGS. 9A and 9B, the light beams B emitted from the light emitting points 2a to 2d, respectively, form light beam spots 30a to 30d on the photosensitive drum 25. These light beam spots 30a to 30d are of equal interval in the direction of sub scanning, the interval being approximately 31.8 μm. As shown in FIG. 9A, in forming an image of 400 dpi on the photosensitive drum 25, only the light emitting points 2a and 2c are lighted. As a result, the light beams B emitted from the light emitting points 2a and 2c, respectively, form light beam spots 30a and 30c at the interval of 63.5 μm in the direction of sub scanning on the photosensitive drum 25. With these light beam spots 30a and 30c, scanning lines are scanned sequentially from the front extremity of the image. For this process, the feed pitch P in the direction of sub scanning by rotation of the photosensitive drum 25 is set to 127 μm. This feed pitch is maintained constant without depending on the image density.

Next, for switching over the image density from 400 dpi to 800 dpi, all the light emitting points 2a to 2d are lighted. As a result, the light beams B emitted from the light emitting points 2a to 2d, respectively, form light beam spots 30a to 30d at the interval of approximately 31.8 μm in the direction of sub scanning on the photosensitive drum 25. With these light beam spots 30a to 30d, scanning lines are scanned sequentially from the front extremity of the image. This laser diode array 2 of the third example produces functional effects similar to those of the first laser diode array. In addition, the image density can be reworded as a distance between picture elements assigned to each of image data.

Further, emission intensity of the light emitting points 2a–2d is switched over by the controller 42 so that the quantity of incident light on the photosensitive drum 25 becomes constant even with different image densities. That is, the light emitting points 2a to 2d are driven while light emitting points 2a to 2d corresponding to a specified image density are switched to an emission intensity given by a reciprocal ratio of the image density. This is explained concretely by using numerical values. Because two image densities of 400 dpi and 800 dpi are used, the ratio of image densities is 1:2. Accordingly, the ratio of the emission intensity of the light emitting points 2a and 2c for forming an image of 400 dpi to the emission intensity of the light emitting points 2a to 2d for forming an image of 800 dpi is 1:½=2:1.

Figure 10:
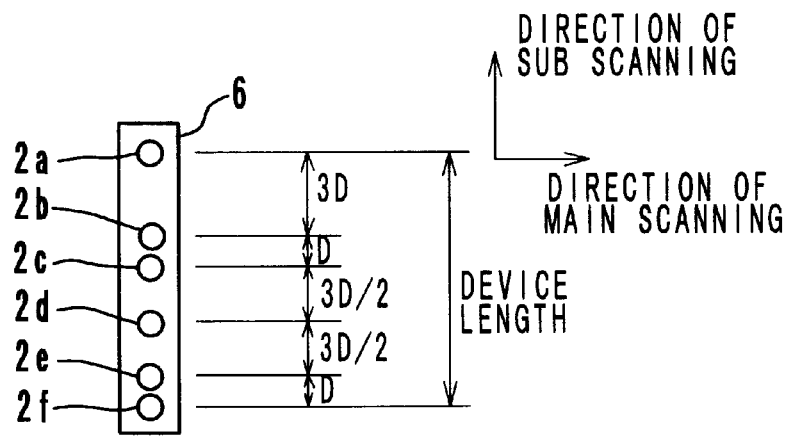
FIG. 10 is a plan view of a fourth example of the laser diode array in accordance with the invention.

Next, a fourth example of the laser diode array 2 is described in detail with reference to FIGS. 10, 11A, 11B and 11C. As shown in FIG. 10, the laser diode array 2 of the fourth example contains a substrate 6 having six light emitting points 2a, 2b, 2c, 2d, 2e and 2f provided on its surface. The light emitting points 2a to 2f are arrayed one-dimensionally at unequal intervals in a direction parallel to the direction of sub scanning.

Figure 11A:
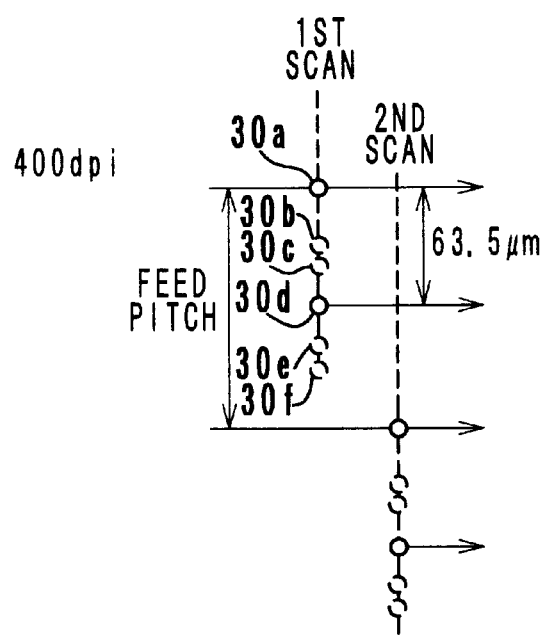
FIGS. 11A, 11B and 11C are illustrations which show beam spots on a photosensitive drum in the case that images of 400 dpi, 600 dpi and 800 dpi are formed, respectively.
Figure 11B:
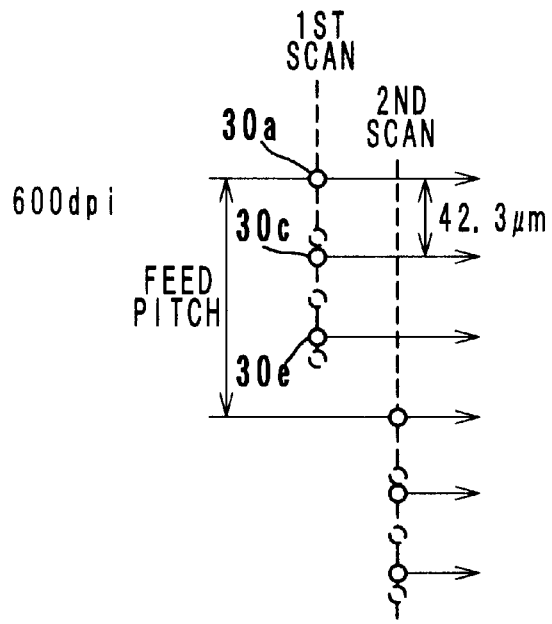
Figure 11C:
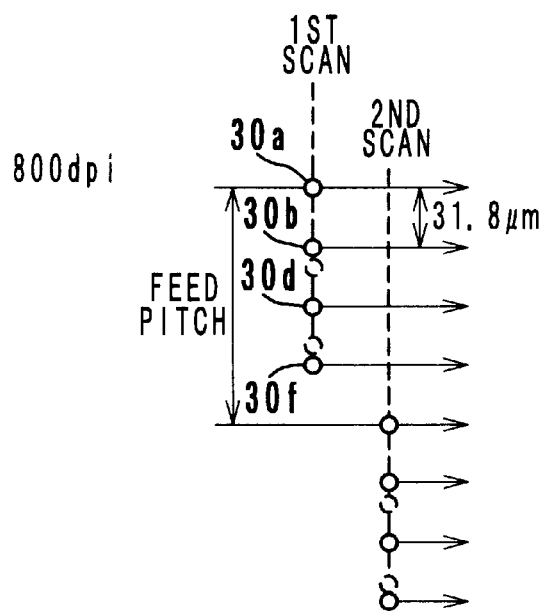

Referring to FIGS. 11A, 11B, and 11C, a description will be provided below on the case that the light beam scanning optical apparatus comprising the laser diode array 2 of the fourth example having the above construction, its image is written operation on the photosensitive drum 25. In the case of the fourth example, three image densities, 400 dpi 600 dpi and 800 dpi, can be switched over.

As shown in FIGS. 11A, 11B and 11C, the light beams B emitted from the light emitting points 2a to 2f, respectively, form light beam spots 30a to 30f on the photosensitive drum 25. These light beam spots 30a to 30f are of unequal intervals in the direction of sub scanning. As shown in FIG. 11A, in forming an image of a 400 dpi on the photosensitive drum 25, only the light emitting points 2a and 2d are lighted. As a result, the light beams B emitted from the light emitting points 2a and 2d, respectively, form light beam spots 30a and 30d at the interval of 63.5 μm in the direction of sub scanning on the photosensitive drum 25. With these light beam spots 30a and 30d, scanning lines are scanned sequentially from the front extremity of the image. For this process, the feed pitch P in the direction of sub scanning by rotation of the photosensitive drum 25 is set to 127 μm. This feed pitch is maintained constant without depending on the image density.

Next, in forming an image of 600 dpi with the image density switched over from 400 dpi to 600 dpi, as shown in FIG. 11B, only the light emitting points 2a, 2c and 2e are lighted. As a result, the light beams B emitted from the light emitting points 2a, 2c and 2e, respectively, form light beam spots 30a, 30c and 30e at the interval of approximately 42.3 μm in the direction of sub scanning on the photosensitive drum 25. With these light beam spots 30a, 30c and 30e, scanning lines are scanned sequentially from the front extremity of the image.

Next, in forming an image of 800 dpi with the image density switched over from 600 dpi to 800 dpi, the light emitting points 2a, 2b, 2d and 2f are lighted. As a result, four light beam spots 30a, 30b, 30d and 30f with a interval of approximately 31.8 μm in the direction of sub scanning are formed on the photosensitive drum 25. This laser diode array 2 of the fourth example produces functional effects similar to those of the first laser diode array. In addition, the image density can be reworded as a distance between picture elements assigned to each of image data.

Further, emission intensity of the light emitting points $2a$ to $2f$ is switched over by the controller 42 so that the quantity of incident light on the photosensitive drum 25 becomes constant even with different image densities. That is, the light emitting points $2a$ to $2f$ are driven while light emitting points $2a$ to $2f$ corresponding to a specified image density are switched to an emission intensity given by a reciprocal ratio of the image density. This is explained concretely by using numerical values. Because three image densities of 400 dpi 600 dpi and 800 dpi are used, the ratio of image densities is 2:3:4. Accordingly, the ratio of the emission intensity of the light emitting points $2a$ and $2d$ for forming an image of 400 dpi, to the emission intensity of the light emitting points $2a$, $2c$ and $2e$ for forming an image of 600 dpi, to the emission intensity of the light emitting points $2a$, $2b$, $2d$ and $2f$ for forming an image of 800 dpi is ½:⅓:¼= 6:4:3.

Figures 12A, 12B:
FIGS. 12A, 12B, 12C and 12D are plan views of other examples of the laser diode array in accordance with the invention, respectively.
Figures 12C, 12D:
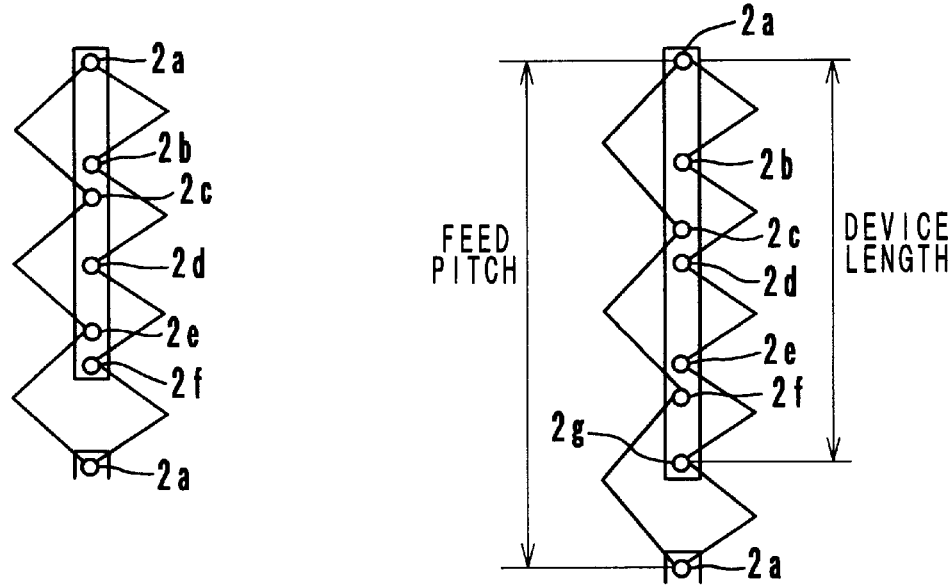

Further, FIGS. 12A to 12D show other examples of the laser diode array 2 in which light emitting points are arrayed one-dimensionally, where two image densities of low density and high density can be switched over. In FIG. 12A, the laser diode array 2 has two light emitting points $2a$ and $2b$, in which a low-density image results when only the light emitting point $2a$ is lighted and a high-density image results when all the light emitting points $2a$ and $2b$ are lighted. The ratio of image densities is 1:2. In FIG. 12B, the laser diode array 2 has three light emitting points $2a$ to $2c$, in which a low-density image results when only the light emitting point $2a$ is lighted and a high-density image results when all the light emitting points $2a$ to $2c$ are lighted. The ratio of image densities is 1:3. In FIG. 12C, the laser diode array 2 has six light emitting points $2a$ to $2f$, in which a low-density image results when the light emitting points $2a$, $2c$ and $2e$ are lighted and a high-density image results when the light emitting points $2a$, $2b$, $2d$ and $2f$ are lighted. The ratio of image densities is 3:4. In FIG. 12D, the laser diode array 2 has seven light emitting points $2a$ to $2g$, in which a low-density image results when the light emitting points $2a$, $2c$ and $2f$ are lighted and a high-density image results when the light emitting points $2a$, $2b$, $2d$, $2e$ and $2g$ are lighted. The ratio of image densities is 3:5.

Next, Table 1 shows results of calculating the required least number of light emitting points, the optimum device length and the optimum feed pitch in each case of FIGS. 12A, 12B, 12C and 12D. In FIGS. 12A to 12D, the interval of the light emitting points $2a$ to $2g$ and the interval of the light beams emitted from the light emitting points $2a$ to $2g$ on the photosensitive drum 25 are of equal to each other. Accordingly, the closest light emitting point interval D and the interval d of the light beams emitted from the closest light emitting points on the photosensitive drum 25 are of equal numerical value. However, without the limitation to this, the two intervals may be of different numerical values.

TABLE 1

| | Image density ratio, $a_1:a_2$ ($a_1 < a_2$) | | Optimum feed pitch | Optimum device length | Required least number of Light emitting points | L.C.M. |
|---|---|---|---|---|---|---|
| | $a_1$ | $a_2$ | | | | |
| FIG. 12A | 1 | 2 | 2 | 1 | 2 | 2 |
| FIG. 12B | 1 | 3 | 3 | 2 | 3 | 3 |
| FIG. 12C | 3 | 4 | 12 | 9 | 6 | 12 |
| FIG. 12D | 3 | 5 | 15 | 12 | 7 | 15 |
| | ↓ | ↓ | ↓ | ↓ | ↓ | ↓ |
| Generalized | $a_1$ | $a_2$ | $d \times m$ | $D \times (m - a_1)$ | $a_1 + a_2 - 1$ | m |

Further examples of the laser diode array 2 in which the light emitting points are arrayed two-dimensionally are described in detail with reference to FIGS. 13 to 15B.

Figure 13:
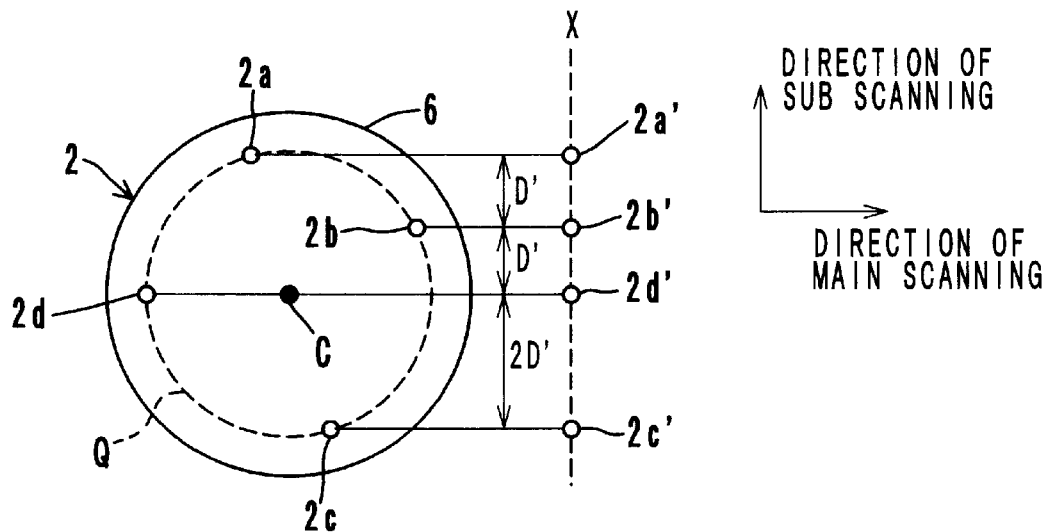
FIG. 13 is a plan view of an example of the laser diode array in accordance with the invention in which light emitting points are of a two-dimensional array.

As shown in FIG. 13, four light emitting points $2a$, $2b$, $2c$ and $2d$ are provided at an outer peripheral portion of the surface of a circular substrate 6. These light emitting points $2a$ to $2d$ are disposed on a circumference Q of a circle having its center on the axis of symmetry (optical axis C) of the collimator lens 5. This arrangement makes the positions of the light emitting points $2a$ to $2d$ optically equivalent with respect to the collimator lens 5. Consequently, variations in convergence among the light beams emitted from the light emitting points $2a$ through $2d$ is restrained, so that the uniformity of image is improved. This laser diode array 2 is enabled to switch over two image densities, 400 dpi and 600 dpi.

Generally, the required least number of two-dimensionally arrayed light emitting points can be determined as $\Sigma a_i - 1$, when the ratio of n image densities to be switched over is $a_1:a_2:\ldots:a_n$ ($a_1 < a_2 < \ldots < a_n$, and $a_1$ through $a_n$ are reduced least values). Then, when the L.C.M. of $a_1$, $a_2$, $\ldots$, $a_n$ is m, and when two-dimensionally arrayed light emitting points are projected on an axis parallel to the direction of sub scanning, then the optimum interval (hereinafter, referred to as optimum projectional device length) between two projectional light emitting points located at both ends of the projectional light emitting points is $(m-a_1)$ times the closest projectional light emitting point interval D'.

Accordingly, in the case of this laser diode array 2, because the ratio of image densities is $a_1:a_2=2:3$, the required least number of light emitting points is $\Sigma a_i - 1 = a_1 + a_2 - 1 = 2 + 3 - 1 = 4$ (points). Also, because the L.C.M. m of $a_1=2$ and $a_2=3$ is 6, optimum projectional device length between the projectional light emitting points $2a'$ and $2c'$ is $(m-a_1) \times D' = (6-2) \times D' = 4D'$. Where, the projectional light emitting points $2a'$ to $2d'$ are one-dimensionally arrayed at unequal intervals in a direction of axis X parallel to the direction of sub scanning, the interval between the projectional light emitting points $2a'$ and $2b'$ and the interval between the projectional light emitting points $2b'$ and $2d'$ are both assumed to be D', and the interval between the projectional light emitting points $2c'$ and $2d'$ is assumed to be 2D'.

Figure 14:
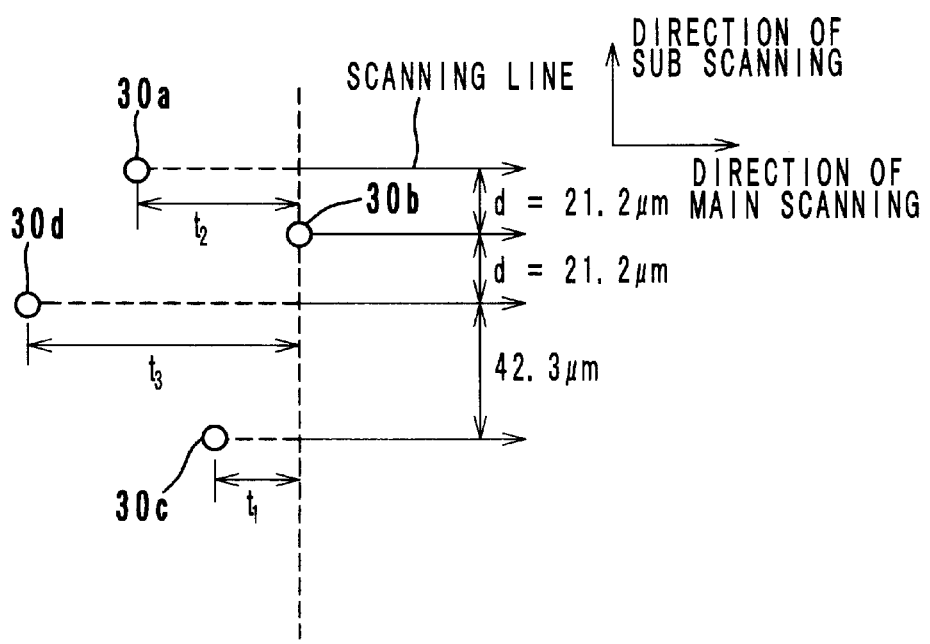
FIG. 14 is an illustration which shows beam spots on a photosensitive drum of laser beams emitted from the laser diode array shown in FIG. 13.

As shown in FIG. 14, the light beams B emitted from the light emitting points $2a$ to $2d$, respectively, form light beam spots 30a to 30d on the photosensitive drum 25 at unequal interval in the direction of sub scanning. The interval between the spots 30a and 30b as well as the interval between the spots 30b and 30d are approximately 21.2 μm, while the interval between the spots 30c and 30d is approximately 42.3 μm.

In the laser diode array 2 in which the light emitting points are two-dimensionally arrayed, the positions of the light emitting points 2a to 2d are different from one another in the direction of main scanning. Accordingly, the starting positions in a writing operation performed by the light emitting points 2a to 2d shift from one another with respect to the direction of main scanning, when light beams are simultaneously emitted from the light emitting points 2a to 2d. In order to align the starting positions in a writing operation performed by the light emitting points 2a to 2d, the starts of the driving of the light emitting points 2a, 2c and 2d have to be delayed relative to the start of the driving of the light emitting point 2b. More specifically, as shown in FIG. 14, the driving of the referential light emitting point 2b is started on the basis of image data after the lapse of a time $t_0$ since a vertical synchronizing signal for determining a starting position in printing is detected in each scanning operation. The driving of the light emitting points 2a, 2c and 2d is started on the basis of image data after the subsequent lapse of delay times $t_1$, $t_2$ and $t_3$, respectively. Thus, in the light beam scanning optical apparatus, the starting positions in writing are aligned.

Figure 15A:
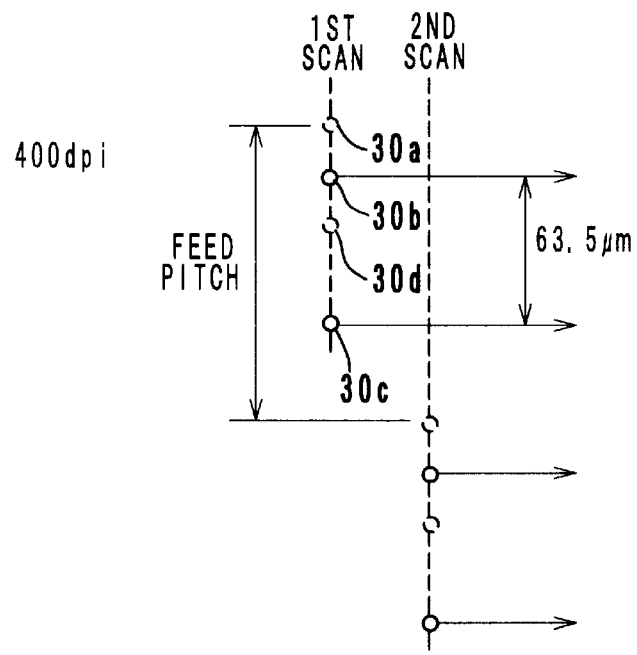
FIGS. 15A and 15B are illustrations which show beam spots on a photosensitive drum in the case that images of 400 dpi and 600 dpi are formed, respectively.
Figure 15B:
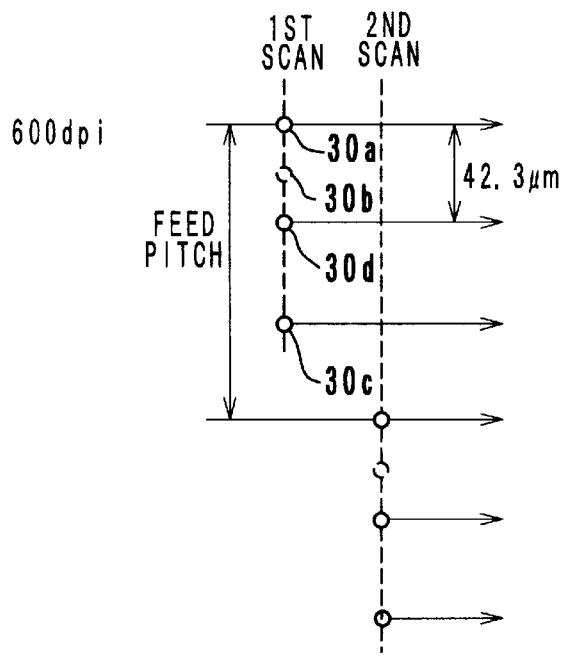

Referring to FIGS. 15A and 15B, a description will be provided below on the case that the light beam scanning optical apparatus comprising this laser diode array 2 in which the light emitting points are two-dimensionally arrayed, its image is written on the photosensitive drum 25.

As shown in FIG. 15A, in forming an image of 400 dpi on the photosensitive drum 25, the light emitting points 2b and 2c are lighted. As a result, the light beams B emitted from the light emitting points 2b and 2c, respectively, form on the photosensitive drum 25 light beam spots 30b and 30c at the interval of 63.5 μm in the direction of sub scanning. With these light beam spots 30b and 30c, scanning lines are scanned sequentially from the front extremity of the image.

Generally, an optimum distance (hereinafter, referred to as optimum feed pitch) to which the surface of the photosensitive drum 25 moves in the direction of sub scanning during one deflective scan of the polygon mirror 12 is set to m times the distance on the photosensitive drum 25 of the light beams emitted from the closest projectional light emitting points (where m is the L.C.M. of $a_1, a_2, \ldots, a_n$). Accordingly, in this case, the optimum feed pitch is determined to be m×21.2=6×21.2≈127 μm. This optimum feed pitch is maintained constant without depending on the image density.

Next, in switching over the image density from 400 dpi to 600 dpi, as shown in FIG. 15B, the light emitting points 2a, 2c and 2d are lighted. As a result, the light beams B emitted from the light emitting points 2a, 2c and 2d, respectively, form light beam spots 30a, 30c, 30d at the interval of approximately 42.3 μm in the direction of sub scanning on the photosensitive drum 25. With these light beam spots 30a, 30c and 30d, scanning lines are scanned sequentially from the front extremity of the image.

This laser diode array 2 having two-dimensionally arrayed light emitting points 2a to 2d produces functional effects similar to those of the first laser diode array. Moreover, even if the intervals of the light emitting points 2a to 2d are set relatively wide, the intervals between the light emitting points 2a to 2d in the direction of sub scanning can be narrowed apparently, so that thermal crosstalk between the light emitting points 2a to 2d can be suppressed.

Figure 16:
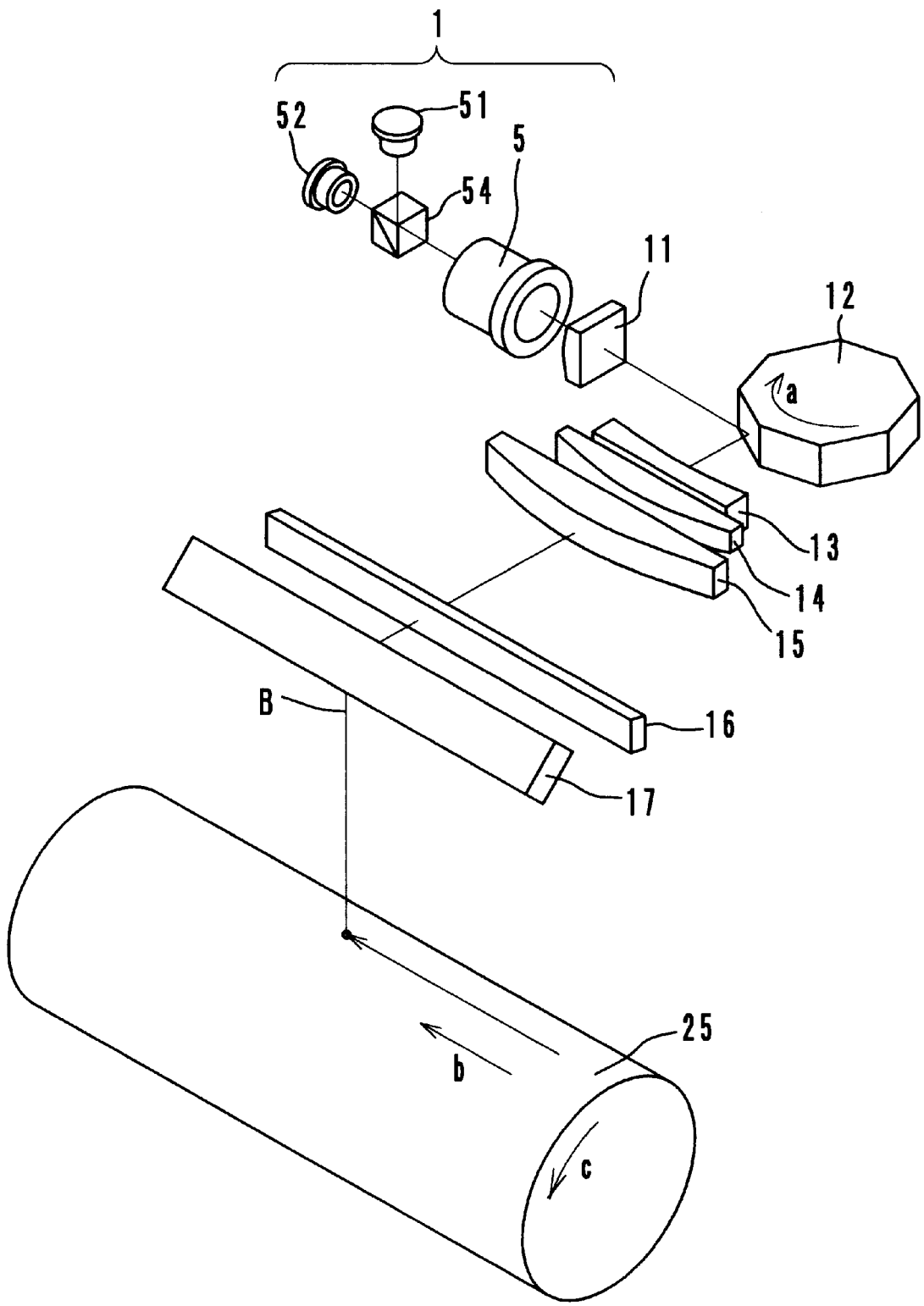
FIG. 16 is a schematic view of another embodiment of the light beam scanning optical apparatus in accordance with the invention.

Furthermore, a case of the light beam scanning optical apparatus equipped with a light source unit 1 shown in FIG. 16 is described.

Figure 17:
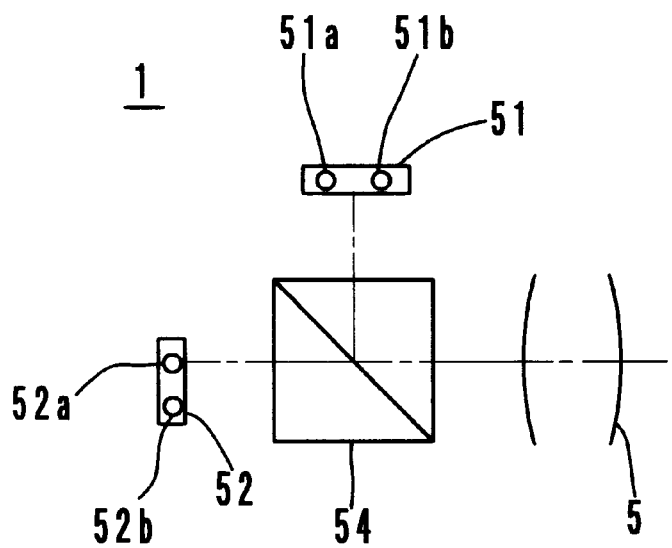
FIG. 17 is a side view of the light source unit shown in FIG. 16.

As shown in FIG. 17, the light source unit 1 comprises a laser diode array 51 having two light emitting points 51a, 51b, a laser diode array 52 having two light emitting points 52a, 52b, a beam coupling device 54 and a collimator lens 5. The laser diode arrays 51 and 52 are disposed so that the direction in which a light beams B of the laser diode array 51 are emitted and the direction in which light beams B of the laser diode array 52 are emitted are orthogonal to each other.

The beam coupling device 54 is a filter mirror; that is, the device 54 comprises two prisms joined through a half mirror film. Light beams B emitted from the laser diode array 51 are perpendicularly reflected by the half mirror film, and are shaped into a parallel (or convergent) bundle of rays by the collimator lens 5. On the other hand, light beams B emitted from the laser diode array 52 pass through the half mirror film in the beam coupling device 54 and travel straight, and are shaped into a parallel (or convergent) bundle of rays by the collimator lens 5. The light beams B emitted from the laser diode arrays 51, 52 are coupled by the beam coupling device 54 so as to travel in the same direction while adjoining are another at unequal intervals with respect to the direction of sub scanning. In this process, a light beam B emitted from the light emitting point 52a of the laser diode array 52 is positioned between the light beams B emitted from the light emitting points 51a, 51b of the laser diode array 51.

The light beams B from the collimator lens 5 travel by way of the cylindrical lens 11, the polygon mirror 12, the fθ-lenses 13 to 15, the cylindrical lens 16 and the plane mirror 17 to be focused on the photosensitive drum 25. This light beam scanning optical apparatus is enabled to switch over between two image densities, 400 dpi and 600 dpi. That is, an image of 400 dpi is obtained when only the light emitting points 51a and 51b are lighted, and an image of 600 dpi is obtained when only the light emitting points 51a, 52a and 52b are lighted.

Generally, the required least number of light emitting points can be determined as $\Sigma a_i - 1$, when the ratio of n image densities to be switched over is $a_1:a_2: \ldots :a_n$ ($a_1 < a_2 < \ldots < a_n$, and $a_1$, to $a_n$ are reduced least values). Then, when the L.C.M. of $a_1, a_2, \ldots, a_n$ is m, then the optimum interval between two light emitting positions located at both ends of the light emitting positions on the light emitting surface of the beam coupling device 54 of the light beams B emitted from the light emitting points 51a to 52b is $(m-a_1)$ times the closest light emitting position interval R.

Accordingly, in the case of this light beam scanning optical apparatus, because the ratio of image densities is $a_1:a_2=2:3$, the required least number of light emitting points is $\Sigma a_i - 1 = a_1 + a_2 - 1 = 2 + 3 - 1 = 4$ (points). In this embodiment, these four light emitting points are apportioned to the laser diode arrays 51 and 52, two for each. Also, because the L.C.M. m of $a_1=2$ and $a_2=3$ is 6, the optimum interval between the two light beam emitting positions located at both ends of the individual light emitting positions on the light emitting surface of the beam coupling device 54 with regard to the light beams B emitted from the light emitting points 51a to 52b is $(m-a_1) \times R = (6-2) \times R = 4R$. Where, the light emitting positions of the respective light beams B emitted from the light emitting points 51a to 52b on the light emitting surface of the beam coupling device 54 are one-dimensionally arrayed at unequal intervals in a direction parallel to the direction of sub scanning. Further, the interval between the light emitting positions on the beam coupling device 54 of the light beams emitted from the light emitting points 52a and 51b and the interval between the light emitting positions on the beam coupling device 54 of the light beams emitted from the light emitting points 51b and 52b are both assumed to be R, and the interval between the light emitting positions on the beam coupling device 54 of the light beams emitted from the light emitting points 51a and 52a is assumed to be 2R.

Figure 18:
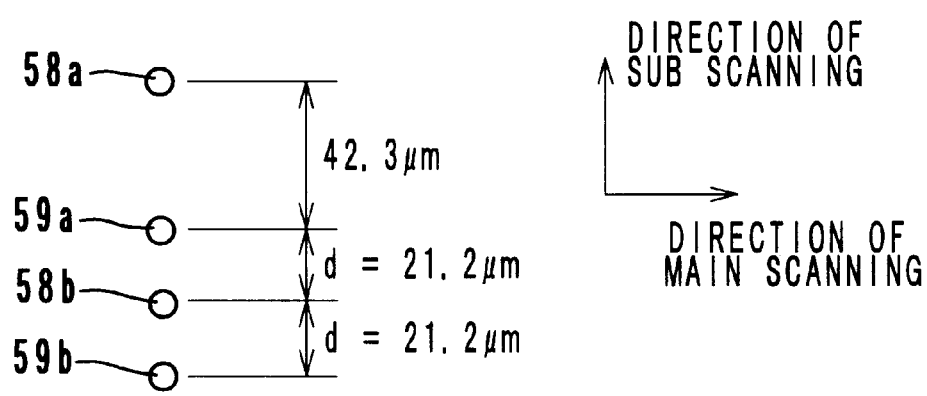
FIG. 18 is an illustration which shows beam spots on a photosensitive drum of laser -beams emitted from the light source unit shown in FIG. 16.

As shown in FIG. 18, the light beams B emitted from the light emitting points 51a, 51b, 52a and 52b, respectively, form light beam spots 58a, 58b, 59a and 59b on the photosensitive drum 25 at unequal interval in the direction of sub scanning. The interval between the spots 59a and 58b as well as the interval between the spots 58b and 59b are approximately 21.2 µm, while the interval between the spots 58a and 59a is approximately 42.3 µm.

Next, with regard to this light beam scanning optical apparatus, its image writing operation onto the photosensitive drum 25 is described.

In forming an image of 400 dpi on the photosensitive drum 25, the light emitting points 51a and 51b are lighted. As a result, the light beams B emitted from the light emitting points 51a and 51b, respectively, form light beam spots 58a and 58b at the interval of 63.5 µm in the direction of sub scanning on the photosensitive drum 25. With these light beam spots 58a and 58b, scanning lines are scanned sequentially from the front extremity of the image.

In the case of this light beam scanning optical apparatus, an optimum distance (hereinafter, referred to as optimum feed pitch) to which the surface of the photosensitive drum 25 moves in the direction of sub scanning during one deflective scan of the polygon mirror 12 is set to m times the distance on the photosensitive drum 25 of the light beam passing through the closest light beam emitting position on the light emitting surface of the beam coupling device 54 (where m is the L.C.M. of $a_1, a_2, \ldots, a_n$). Accordingly, in this case, the optimum feed pitch is determined to be m×21.2=6×21.2≈127 µm. This optimum feed pitch is maintained constant without depending on the image density.

Next, for switching over the image density from 400 dpi to 600 dpi, the light emitting points 51a, 52a and 52b are lighted. As a result, the light beams B emitted from the light emitting points 51a, 52a and 52b, respectively, form light beam spots 58a, 59a and 59b at the interval of approximately 42.3 µm in the direction of sub scanning on the photosensitive drum 25. With these light beam spots 58a, 59a and 59b, scanning lines are scanned sequentially from the front extremity of the image.

This light beam scanning optical apparatus is enabled to switch over the image density at any arbitrary time point during the sequential scanning process from start to end while the rotating speed of the polygon mirror 12, i.e., the scanning speed is maintained constant. Besides, the light source unit is comprised of two elements of the laser diode arrays 51 and 52, and therefore the interval between the light emitting points 51a and 52b can be made wider than the interval between light emitting points in a light source unit comprised of a single laser diode array, so that the influence of thermal crosstalk can be suppressed. Additionally, with respect to the direction of sub scanning, the beam spot 58b which is formed on the photosensitive drum 25 by the light beam B emitted from the laser diode array 51 is positioned between the beam spots 59a and 59b which are formed by the light beams B emitted from the laser diode array 52, and therefore the interval between the light emitting points 51b, 52a and 52b can be narrowed apparently. As a result, the intervals of the light beams B on the photosensitive drum 25 can be narrowed even though the interval between the light emitting points 52a and 52b is relatively wide, so that thermal crosstalk between the light emitting points 52a and 52b can be further suppressed.

In the above embodiments, the beam scanning interval in the direction of sub scanning has been changed responsive to the image density (resolution) required by the image data. Besides, the size of picture element may be changed proportionally to the beam scanning interval in the direction of sub scanning. For changing the size of picture element proportionally to the beam scanning interval in the direction of sub scanning, for example, a laser diode which can be changed the beam diameter in one direction, as described in Japanese Patent Laid-Open Publication No. 7-89131, 0 plus E (1996-05), TECHNICAL REPORT OF IEICE.LQE 95-1 (1995-05). That is, the light emitting points of this laser diode are arrayed at optically different or equal intervals with respect to the direction of sub scanning, and moreover so that the beam diameter can be changed in a direction parallel to the direction of sub scanning. Furthermore, the laser diode is driven by drivers which can control the light emitting time of the light emitting points at short intervals by pulse width modulation. Then, responsive to a switch in the image density (resolution) required by image data, the combination of at least two light emitting points for effecting light emission among light emitting points is changed over. Further, responsive to the interval of beam scanning lines in the direction of sub scanning, the beam diameter in the direction of sub scanning is changed while the light emitting time of the light emitting points is controlled. As a result, the size of picture element in the direction of main scanning and the direction of sub scanning can be changed over.

Figure 19:
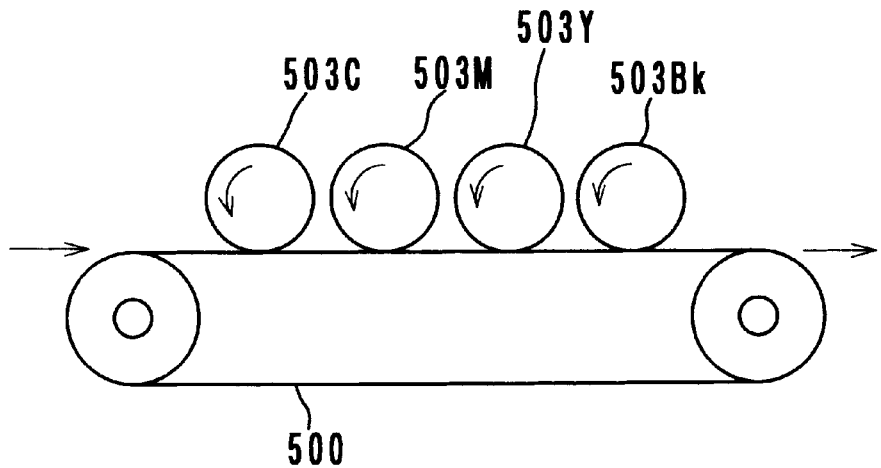
FIG. 19 is a schematic view of another type of the light beam scanning optical apparatus in accordance with the invention.

Also, as shown in FIG. 19, the present invention is effectively applied to a tandem type light beam scanning optical apparatus in which, for example, photoconductors 503C, 503M, 503Y and 503Bk for cyan, magenta, yellow and black, respectively, are arranged in one line so as to face a transfer belt. In FIG. 19, reference numeral 500 designates the transfer belt.

Figure 20:
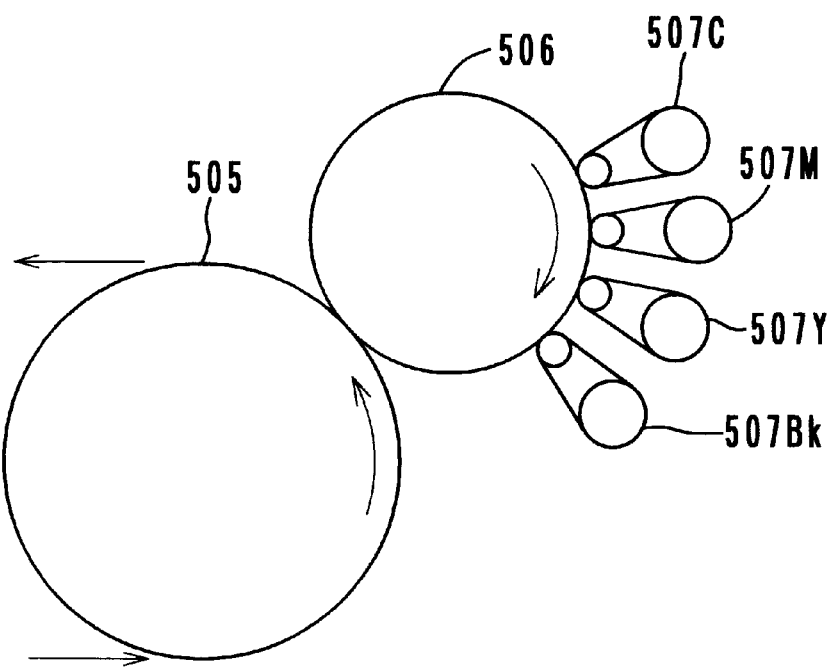
FIG. 20 is a schematic view of still another type of the light beam scanning optical apparatus in accordance with the invention.

Further, as shown in FIG. 20, the present invention can be effectively applied to a light beam scanning optical apparatus comprising a transfer drum 505, a photosensitive drum 506, and developing units 507C, 507M, 507Y and 507Bk for cyan, magenta, yellow and black, respectively, arranged around the photosensitive drum 506.

Although the present invention has been described in connection with the preferred embodiments above, it is to be noted that various changes and modifications are apparent to a person skilled in the art. Such changes and modifications are to be understood as being within the scope of the present invention.

What is claimed is:

1. A light beam scanning optical apparatus which scans a scanning surface with light beams, comprising:

a light source unit having at least three light emitting points, the three light emitting points being arranged so as to optically have intervals from one another in a direction perpendicular to the direction in which the light beams scan on the scanning surface;

a deflecting device for deflecting light beams emitted from the light emitting points to scan the scanning surface; and a controller which selects and lights simultaneously at least two out of the light emitting points, the controller changes a combination of light emitting points to be lighted for switching image density at any arbitrary time point during a sequential operation of scanning the scanning surface from start to end, and an interval between incident light beams emitted from the light emitting points to the scanning surface differs at every combination of light emitting points, wherein one picture element is formed with a light beam emitted from one light emitting point on the scanning surface.

2. A light beam scanning optical apparatus as claimed in claim 1, wherein the light emitting points are one-dimensionally arranged, and a ratio of n image densities to be switched over is $a_1:a_2: \ldots :a_n(a_1<a_2< \ldots <a_n)$, the number of light emitting points is $$\sum_{i=1}^{n} a_i - 1.$$

3. A light beam scanning optical apparatus as claimed in claim 2, wherein the least common multiple of $a_1, a_2, \ldots, a_n$ is m, an interval between two light emitting points positioned at both ends of the plurality of one-dimensionally arrayed light emitting points is $(m-a_1)$ times an interval between the closest light emitting points.

4. A light beam scanning optical apparatus as claimed in claim 3, wherein a distance to which the scanning surface moves in a direction of sub scanning during one deflective scan of the deflecting device is approximately m times an interval between the light beams emitted from the closest light emitting points on the scanning surface.

5. A light beam scanning optical apparatus as claimed in claim 4, wherein light emitting points corresponding to a specified image density are lighted with an emission intensity given by a reciprocal ratio of the image density.

6. A light beam scanning optical apparatus as claimed in claim 1, wherein a ratio of n image densities to be switched over is $a_1:a_2: \ldots :a_n(a_1<a_2< \ldots <a_n)$, the number of light emitting points is $$\sum_{i=1}^{n} a_i - 1.$$

and the least common multiple of $a_1, a_2, \ldots, a_n$ is m, and the plurality of two-dimensionally arrayed light emitting points are projected on an axis parallel to the direction of sub scanning, an interval between two projectional light emitting points positioned at both ends of a plurality of projectional light emitting points is $(m-a_1)$ times an interval between closest projectional light emitting points, and a distance to which the scanning surface moves in the direction of sub scanning during one deflective scan of the deflecting device is approximately m times an interval between light beams of the closest projectional light emitting points on the scanning surface.

7. A light beam scanning optical apparatus as claimed in claim 1, wherein the light source unit further comprises a beam coupling device for superimposing light beams emitted from the light emitting points, so as to make the light beams travel in the same direction, and wherein a ratio of n image densities to be switched over is $a_1:a_2: \ldots :a_n(a_1<a_2< \ldots <a_n)$, the number of light emitting points is $$\sum_{i=1}^{n} a_i - 1.$$

and the least common multiple of $a_1, a_2, \ldots, a_n$ is m, an interval between two light beam emitting positions located at both ends of the plurality of light beam emitting positions on the light emitting surface of the beam coupling device is $(m-a_1)$ times an interval between closest light beam emitting positions, and a distance to which the scanning surface moves in the direction of sub scanning during one deflective scan of the deflecting device is approximately m times an interval between the light beams emitted from the closest light emitting positions on the scanning surface.

8. A light beam scanning optical apparatus as claimed in claim 1, further comprising:

clock frequency switching means for changing a clock frequency of drive signals for the light emitting points in response to the image density.

9. An image projecting apparatus which projects an image on a recording member on a picture element basis, the recording member moves in a specified direction, comprising:

a light source unit having at least three light emitting points, the three light emitting points being arranged so as to optically have intervals from one another in a direction corresponding to the direction in which the recording member moves;

an optical element for allowing light beams emitted from the light emitting points to be focused on the recording member;

a scanning element for scanning the recording member with the light beams emitted from the light emitting points at a specified speed in a direction perpendicular to the direction in which the recording member moves; and a controller which selects and lights simultaneously at least two out of the light emitting points in response to input image data, the controller changes a combination of light emitting points to be lighted for switching a distance between picture element on the recording member, in response to distances between picture elements assigned for each of the image data in the direction in which the recording member moves, without changing scanning speed of the scanning element, an interval between incident light beams to the recording member differs at every combination of light emitting points, wherein one picture element is projected with a light beam emitted from one light emitting point on the recording member.

10. An image projecting apparatus which projects an image on an imaging surface on a picture element basis, comprising:

a light source unit having at least three light emitting points, the three light emitting points being arranged so as to optically have intervals from one another in a specified direction;

an optical system for allowing light beams emitted from the light emitting points to be focused on the imaging surface; and a controller which selects and lights simultaneously at least two out of the light emitting points, in response to input image data, the controller changes a combination of light emitting points to be lighted for switching a distance between picture element on the imaging surface, in response to distances between picture elements assigned for each of the image data within one screen, an interval between incident light beams to the imaging surface differs at every combination of light emitting points, wherein one picture element is projected with a light beam emitted from one emitting point on the imaging surface.

* * * * *